(12) United States Patent
Janin et al.

(10) Patent No.: US 8,364,650 B2
(45) Date of Patent: Jan. 29, 2013

(54) SYSTEM AND METHOD TO MAINTAIN COHERENCE OF CACHE CONTENTS IN A MULTI-TIER SYSTEM AIMED AT INTERFACING LARGE DATABASES

(75) Inventors: Benoit Janin, Nice (FR); Rémy Gole, Nice (FR); Luc Isnardy, Nice (FR); Rudy Daniello, Nice (FR); Wayne Rubenstein, Nice (FR)

(73) Assignee: Amadeus S.A.S., Sophia Antipolis (FR)

( * ) Notice: Subject to any disclaimer, the term of this patent is extended or adjusted under 35 U.S.C. 154(b) by 476 days.

(21) Appl. No.: 12/088,860

(22) PCT Filed: Sep. 27, 2006

(86) PCT No.: PCT/EP2006/066819
§ 371 (c)(1),
(2), (4) Date: Apr. 1, 2008

(87) PCT Pub. No.: WO2007/039535
PCT Pub. Date: Apr. 12, 2007

(65) Prior Publication Data
US 2008/0235292 A1    Sep. 25, 2008

Related U.S. Application Data

(60) Provisional application No. 60/723,445, filed on Oct. 5, 2005.

(30) Foreign Application Priority Data

Oct. 3, 2005    (EP) ..................................... 05109147

(51) Int. Cl.
*G06F 7/00*    (2006.01)
*G06F 17/00*    (2006.01)

(52) U.S. Cl. ...................................... 707/690

(58) Field of Classification Search ........... 707/999.201, 707/690
See application file for complete search history.

(56) References Cited

U.S. PATENT DOCUMENTS 6,192,370 B1 *    2/2001    Primsch ................................ 1/1
6,477,543 B1 *    11/2002    Huang et al. .......................... 1/1
(Continued)

FOREIGN PATENT DOCUMENTS

CN    1549978 A    11/2004
JP    2002176451 A    6/2002
(Continued)

OTHER PUBLICATIONS

Japanese Office Action, dated Nov. 1, 2011, in Application No. 2008-532780.

*Primary Examiner* — Alexey Shmatov
(74) *Attorney, Agent, or Firm* — Wood, Herron & Evans, LLP

(57) ABSTRACT

A method and a system for maintaining coherence of cache contents in a multi-tiered architecture of servers are described. This includes a front tier of satellite servers, each operating a local cache, and a middle tier of central servers each operating a central cache. Central servers interface with databases through database servers to retrieve the data elements used to construct objects and store them in central caches. Once constructed, objects are attributed a time-to-live (TTL) and stored in central caches then, forwarded to the satellite servers where they are stored in local caches before being delivered to the software applications that have requested them. They are invalidated when outdated and reconstructed from a central server from where they are forwarded to all central caches and to the local caches where they are needed.

21 Claims, 7 Drawing Sheets

U.S. PATENT DOCUMENTS

| | | | |
|---|---|---|---|
| 6,772,203 B1 * | 8/2004 | Feiertag et al. | 709/219 |
| 6,934,717 B1 | 8/2005 | James | |
| 2002/0069278 A1 * | 6/2002 | Forslow | 709/225 |
| 2003/0014526 A1 * | 1/2003 | Pullara et al. | 709/227 |
| 2004/0210909 A1 * | 10/2004 | Dominguez et al. | 719/316 |
| 2004/0243642 A1 * | 12/2004 | Irudayaraj et al. | 707/200 |
| 2005/0071391 A1 * | 3/2005 | Fuerderer et al. | 707/204 |

FOREIGN PATENT DOCUMENTS

| | | |
|---|---|---|
| JP | 2004504681 A | 2/2004 |
| WO | 01/55855 A1 | 8/2001 |
| WO | 0207364 A2 | 1/2002 |

* cited by examiner

SYSTEM AND METHOD TO MAINTAIN COHERENCE OF CACHE CONTENTS IN A MULTI-TIER SYSTEM AIMED AT INTERFACING LARGE DATABASES

FIELD OF THE INVENTION

The present invention relates generally to multi-tier client/server software architectures and, more specifically, to a method and a system to maintain coherence between the contents of caches that are implemented in front and middle tier machines to improve overall performances.

BACKGROUND OF THE INVENTION

The client/server model which has emerged in the late 1980s is a versatile and modular software architecture that was intended to improve usability, flexibility, interoperability, and scalability as compared to centralized, mainframe, time sharing computing that was the norm at that time. A client is a requester of services and a server the provider of such services. Depending on the software configuration, a same machine can be both a client and a server.

The client/server architecture has progressively replaced the previous mainframe software architectures where all intelligence was within the central host computer and where users interacted with the host through a dumb terminal that only captures keystrokes and sends that information to the host. A well-known limitation of mainframe software architectures is that they do not easily support graphical user interfaces (GUI) or access to multiple databases from geographically dispersed sites. Mainframes are still however used as powerful servers in distributed client/server architectures.

The client/server architecture has introduced a database server acting as a file server. In this architecture user queries are answered directly using a relational database management system or RDBMS. The network traffic is reduced by providing a query response rather than always transferring complete files. It also improves multi-user updating through a GUI front end to a shared database. In client/server architectures structured query language (SQL) statements are typically used for the exchange of data between clients and servers.

With the two-tier client/server architecture (100) illustrated in FIG. 1 the user system interface is located in the user's desktop (102) environment and the database management services are in a server (104) that is able to service many clients. Processing management is split between the user system interface environment and the database management server environment. All combinations of topologies including single/multiple clients interfacing single/multiple servers (not shown), most often on a local area network or LAN (108), are obviously possible.

In the traditional two-tier architecture, the first tier, the client (102), holds the user interface, the main business and data processing logic. It accepts and checks syntax of user input, processes application logic, generates database requests, transmits them to server and passes response back to user tasks. The second tier, the data base server (104), accepts and processes database requests from clients, checks authorizations, ensures that integrity constraints are not violated, performs query/update processing and transmits responses to client. It also maintains system catalogue, provides concurrent database access and performs recovery control.

The two-tier client/server architecture has proved to be a good solution for distributed computing when work groups do not exceed 100 people interacting on a LAN simultaneously. However, when the number of users grows, performance begins to deteriorate as a result of the server maintaining a connection via "keep-alive" messages with each client, even though no work is being done. A second limitation of the two-tier architecture is that implementation of processing management services using vendor proprietary database procedures restricts flexibility and choice of RDBMS for applications. Also, implementations of the two-tier architecture have demonstrated limited flexibility in moving (repartitioning) program functionality from one server to another.

Then, the three-tier architecture (120) and multi-tier variants have emerged in the 90's to overcome the above limitations. In the three-tier architecture, a middle tier was added (126) between the user system interface client environment (122) and the database management server environment (124). Although there are a variety of ways of implementing this architecture and the middle tier, this latter is most often in charge of queuing, application execution, and database staging. Typically, a client delivers its request to the middle layer and disengages because the middle tier is due to access the data and returns the answer to the client. In addition the middle layer adds scheduling and prioritization for work in progress.

In the above variant of three-tier architecture the client, the first tier, may have to only perform the user interface i.e., validate inputs; in which case the middle tier holds all the business logic and does data processing while the server, the third tier, performs data validation and controls the database access.

The three-tier client/server architecture has been shown to improve performance for groups with a large number of users (typically, up to one thousand i.e., ten times the two-tier) and improves flexibility when compared to the two-tier approach especially because application code does not have to be shared between layers. The three-tier client/server architecture results in an environment that is considerably more scalable than two-tier architecture with direct client to server connection. It provides the ability to update multiple different RDBMS in a single transaction and can connect to a variety of data sources including flat files, non-relational database management systems, and also to mainframes now often used as powerful database servers. Three and multi-tier architectures thus best fit in large distributed client/server environments. For example, the ones airline reservation companies must deploy to serve their customers i.e.: the travel agencies around the world, and in which shared resources, such as heterogeneous databases (i.e., the air carriers fare and availability databases) and processing rules, are required.

If multi-tier data-centers have become a central requirement to providing such services reducing computation and communication overhead is crucial to further improving the performance and scalability. Caching dynamic content at various tiers of a multi-tier data-center is a well known method to reduce the computation and communication overheads so as even more customers can be served simultaneously since, in case of hit, data does not have to be fetched again from above situated tiers. However, caching in middle and front tiers has its own challenges. Cache consistency and cache coherence become issues that must be handled accordingly. Especially, for airline reservation where obsolete airline availability values are not acceptable, strong consistency and coherence is essential.

OBJECT OF THE INVENTION

Thus, it is a broad object of the invention to provide a method and a system to maintain the coherence of dynamic cache contents in multi-tier software architectures.

It is a more specific object of the invention that this must fit multi-tier architectures such as the ones deployed for airline reservation systems, and characterized by a very high level of transactions from client side and very frequent updates of the fare and availability data bases provided by the air carriers and other such providers of services.

Further objects, features and advantages of the present invention will become apparent to the ones skilled in the art upon examination of the following description in reference to the accompanying drawings. It is intended that any additional advantages be incorporated herein.

SUMMARY OF THE INVENTION

A method and a system for maintaining coherence of cache contents in a multi-tier software architecture are described. This includes a front tier of satellite servers each operating a local cache, and a middle tier of central servers each operating a central cache. Central servers interface with databases through database servers to retrieve the data elements used to construct objects. Once constructed, objects are attributed a time-to-live (TTL) and stored in central caches then, forwarded to the satellite servers where they are stored in local caches before being delivered to the software applications that have requested them. Requests from satellite servers are load balanced over all available central servers. A central server is selected per request to handle. A newly constructed object is replicated in all other central servers from the selected central server. An object is requested from selected central cache whenever it is missing or outdated in local cache. The construction of a requested object is triggered in selected central server whenever it is missing in selected central cache. Construction is skipped if requested object is already present and is not outdated in central cache. One central server is designated as a main central server and all others are backup central servers. The construction is triggered in main central server from an invalidation handler whenever the requested object is found outdated. TTL of found outdated object is set to a low value before being forwarded to the requesting satellite server. The objects stored in central caches and in local caches are invalidated as soon as at least one data element used to construct them has been modified in databases which determine which objects are impacted then, broadcast invalidation commands to all central server invalidation handlers. They invalidate the corresponding objects in central caches then, propagate the invalidation commands to all local caches which, in turn, invalidate and delete the corresponding objects in local caches. The invalidated objects in central caches are either deleted or reconstructed. In this latter case reconstructed object are replicated into all backup central caches.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1:
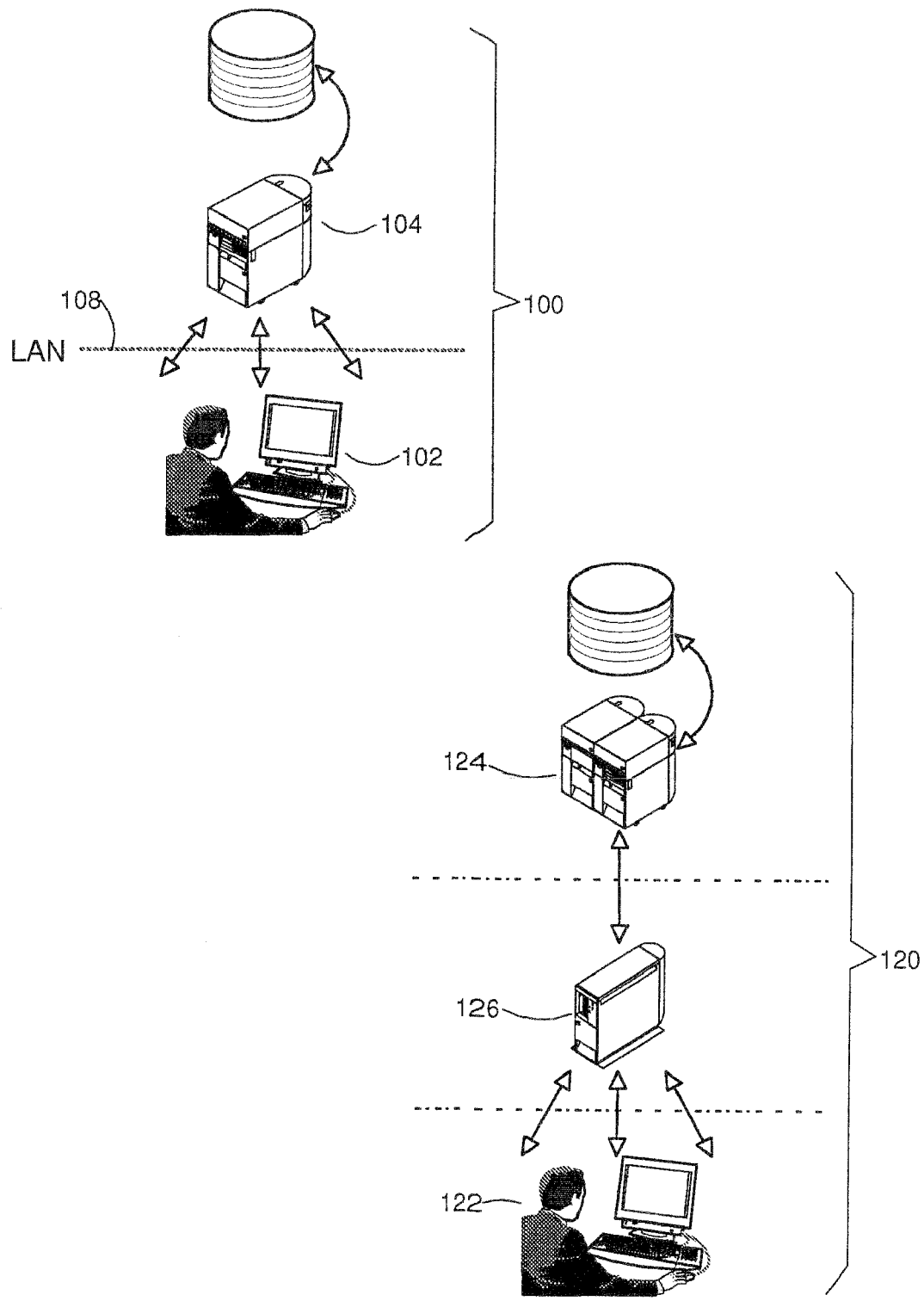
FIG. 1 discusses prior art i.e., 2-tier versus multi-tier software architectures.
Figure 2:
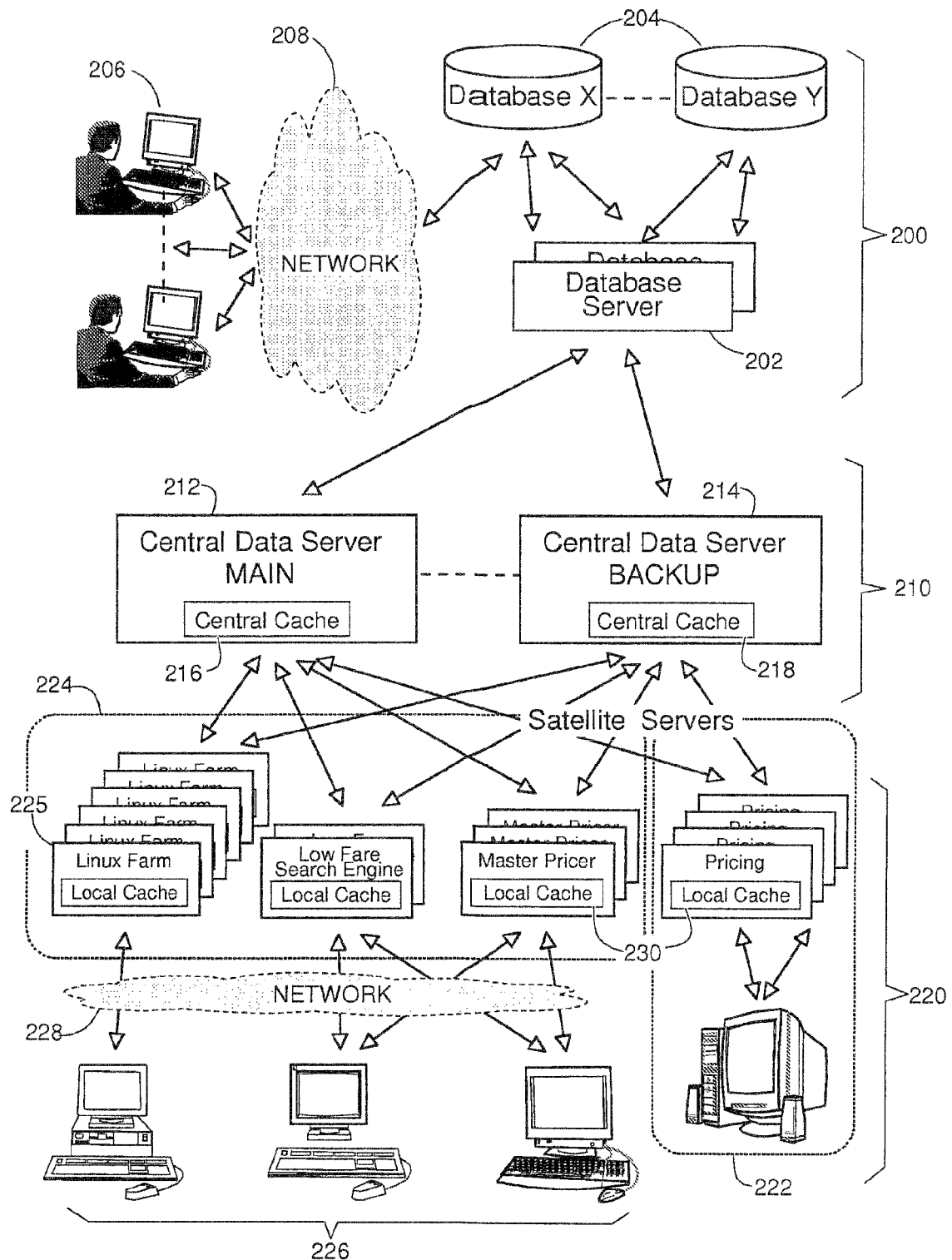
FIG. 2 shows the overall multi-tier software architecture to which the invention best applies.

FIG. 2 describes the overall multi-tier software architecture to which the invention best applies.

The upper tier (200) is the ultimate source, of data where at least one database server (202) generally interfaces multiple databases (204) such as the availability and fare databases provided by travel carriers and other providers of such services from all over the world. Those databases are frequently updated by their users i.e., those in charge of updating and maintaining their contents (206), most often through a combination of private and public networks (208) including the Internet. Overall, on a daily basis, millions of transactions may be recorded involving high volumes of data.

The middle tier (210) is here shown to be comprised of two servers hereafter referenced to as Central Data Server or CDS. Typically, for redundancy, there are a main server (212) and a backup server (214). However, any configuration between one (no redundancy) and many servers is possible. Also, a central server may occasionally have to be configured as a standalone server e.g., for facilitating the maintenance of the system or because designated main CDS is out of order. Moreover, a designated backup server may have to behave temporarily as a main server when necessary. This is further discussed in the following description of the invention.

Having multiple servers in the middle tier is a common practice with this architecture. There may be more than one redundant server, playing the same role as the main server, or specialized servers running different application programs. When more processing power is needed, one way of achieving scalability consists of adding middle servers so that more client transactions can be handled through a load balancing of the front tier (220) requests over more middle-tier servers. Hence, each CDS has its own cache (216, 218), referred to as central caches, which must always hold coherent contents.

In the kind of applications considered by the invention data entities present in caches are broadly referred to as software objects or simply objects in the following. In general, many data elements, obtained from the databases through queries, need to be put together to create them. Hence, an object according to the invention is, for example, a particular travel fare that has been once constructed by a CDS from data elements obtained from the databases (204) through the database server (202). If, as discussed in the background section, database is a relational database this has been achieved in issuing at least one SQL request, and generally many more, to the databases so that all the data elements needed to construct the object e.g., the travel fare of this particular example, can be eventually gathered in CDS. Objects according to the invention are thus assumed to be elaborated objects that require processing power and that use communication bandwidth with the data server to be put in a usable form. Objects can stay in caches as long as the source information that was used to build them has not been modified in the databases. Reconstruction is costly since it consumes processing power and uses part of the available communication bandwidth with the database server and its databases. As far as coherence is concerned, a particular object present in e.g., the central cache of main CDS (216) must be exactly the same as its clone in the backup CDS central cache (218) and their contents must be consistent with the data elements of data bases (204) from where they were constructed. This is further discussed in the following description of the invention.

The front tier (220) is made of a plurality of satellite servers running software applications for their end-users. In the example used to illustrate the invention these are typically pricing or fare search engines. These software applications can run directly on a satellite client server (222) or on independent front-tier satellite servers (224) including farms of servers (225) that are in turn accessed from remote users (226) through a private or public network (228) e.g., the Internet, using standard browsers and Internet most spread application: the world-wide-web or web. In both cases the applications are taking advantage of local caches (230) essentially for reducing the communication overhead between front-tier and CDS's of middle-tier to which all satellite servers are connected. The objects discussed above are thus brought, when necessary, into the various local caches too. Hence, the local applications have not to access a CDS or a data server if object requested is indeed in its local cache. This has the chief advantage of protecting the database servers (202) that is, preventing those servers from receiving myriad of requests from the end-users (226) that would otherwise reach them.

Because software applications are devised with the objective of achieving good cache hit ratios they see their performances dramatically improved. Moreover, this considerably reduces communication overhead between tiers and finally, allows to accommodate many more end-users on a same infrastructure. As already discussed above, all of this assumes that caches coherence is maintained which is further discussed in following figures.

Figure 3:
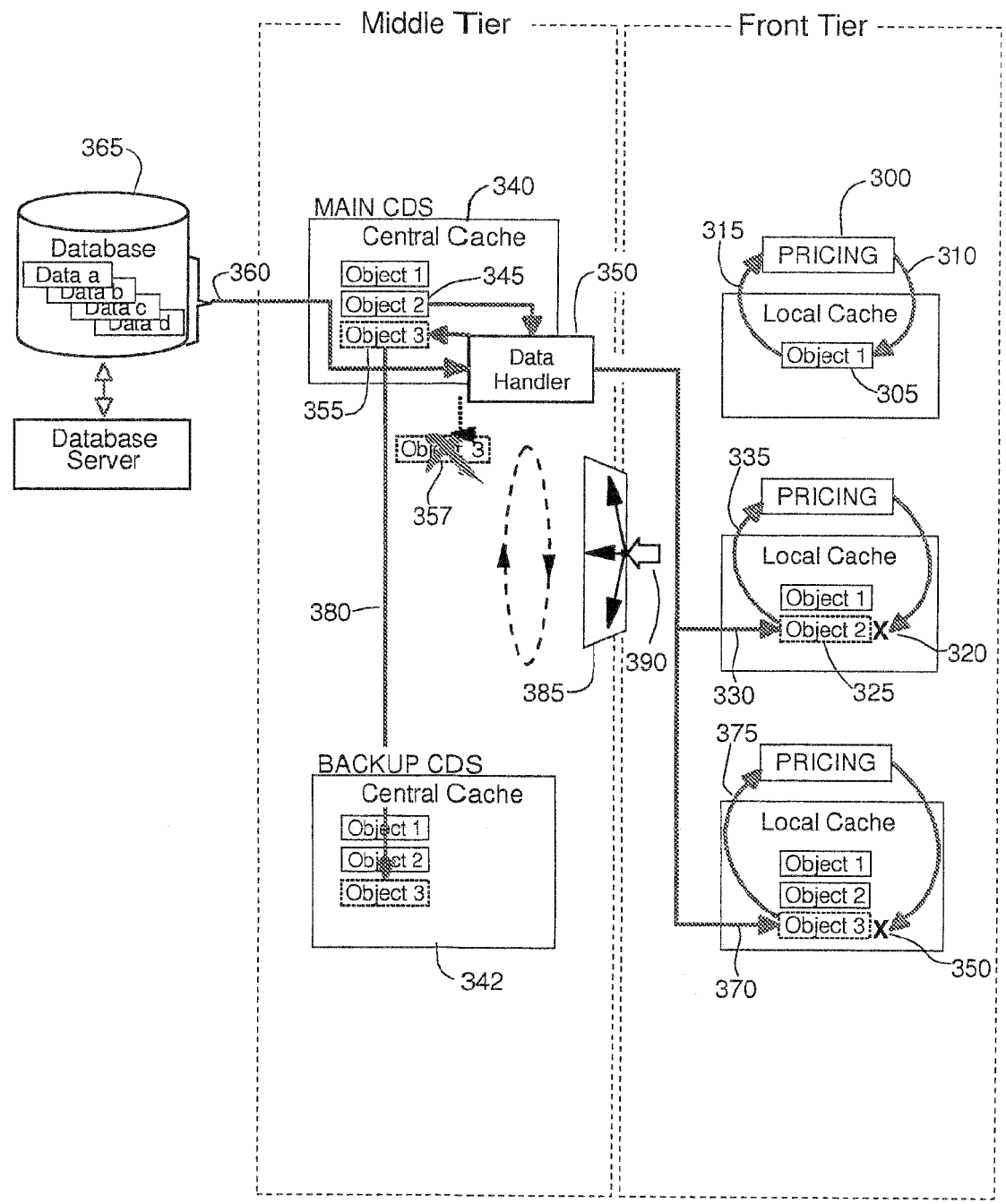
FIG. 3 describes the various cases of object fetching that result from the processing of end-user requests by an application program and the construction of objects in central servers.

FIG. 3 describes the various cases of object fetching that result from the processing of end-user requests by an application program.

When such an application program e.g., a pricing program (300), situated in a front tier server needs an object (305) to compute a travel price local cache is first interrogated (310). If there is a hit, object is simply retrieved from local cache (315). This is the most effective way of retrieving an object since the whole processing only involves the server running the application.

When requested object is not present in local cache though, there is a miss (320). Object must be brought in and it is first assumed here that object is present in central cache of main CODS (340) to which a request is issued (390) through a load balancing function further discussed hereafter. If this is indeed the case (345) a data handler function (350) is aimed at retrieving it from the central cache to forward it (330) to the local cache of the requesting server where it is stored. After this is done, requested object can eventually be delivered to the application program. Hence, local cache contains one more object (325) that can possibly be used for further requests.

When requested object is not present in local cache (350) and not present in central cache of main CDS either (355), it must be constructed in CDS and stored in central cache. This is achieved by the data handler (350) already mentioned which must collect, from the database (365), all the data elements (360) necessary to construct the requested object (355). Constructing the object can be a complex process that may require to issue many requests (e.g.: SQL queries) to the database. Once it is put together a thorough checking of object is performed to make sure it is actually usable by the requesting application. This includes a syntactic and semantic checking of object description language plus a test with an application sample code. If new object passes this validation phase, as it normally does, it is stored in central cache. Prior to storing a time-to-live (TTL) or an expiration date is attached to the object so it can be removed when outdated as further discussed in FIG. 4. Once this is done, new object is forwarded to the local cache of server that has requested it, where it is first stored then delivered (375) to the software application that needs it. However, if validation of new constructed object fails it is rejected thus, not stored in central cache or forwarded to local cache (357).

When a new object is created in main CDS, it is also replicated (380) in backup central server(s) (342) so that the new object can be retrieved from the other central server caches as well. As previously discussed, to allow redundancy and scalability, many middle tier servers may be active simultaneously in order that the requests from the front tier servers can be load balanced over the set of available central data servers. Load balancing, sketched in FIG. 3, which is beyond the scope of the invention, is not further discussed other than to mention that there is a load balancing function (385) that dispatches the front tier requests (390) according to a particular logic or algorithm that can be as simple as the well-known round-robin function. In which case, incoming front tier requests are sent successively to each active central server in sequence until last is reached. Next request is then sent again to the first numbered central server and so on. This simple algorithm is often very effective. Some more sophisticated exist though, like those that measure the actual load of each server and manage to send an incoming request to the least busy.

Hence, previous description that mentioned that a missing object is requested from the main CDS cache must be amended. Depending on the decision made by the load balancing function (385) the missing object may be requested as well from a backup central cache since newly constructed objects are replicated (380) in active servers. In this case, if the object is however not present in the selected backup central cache it must be constructed, like explained above, as if main CDS had been selected. When this occurs, backup behaves temporarily as a main CDS which means that, once constructed, object is replicated from backup to all active CDS's so new object becomes available in all middle tier central caches. This aspect of the invention, where a backup CDS may temporarily act as a main CDS, is also discussed in FIG. 6.

Figure 4:
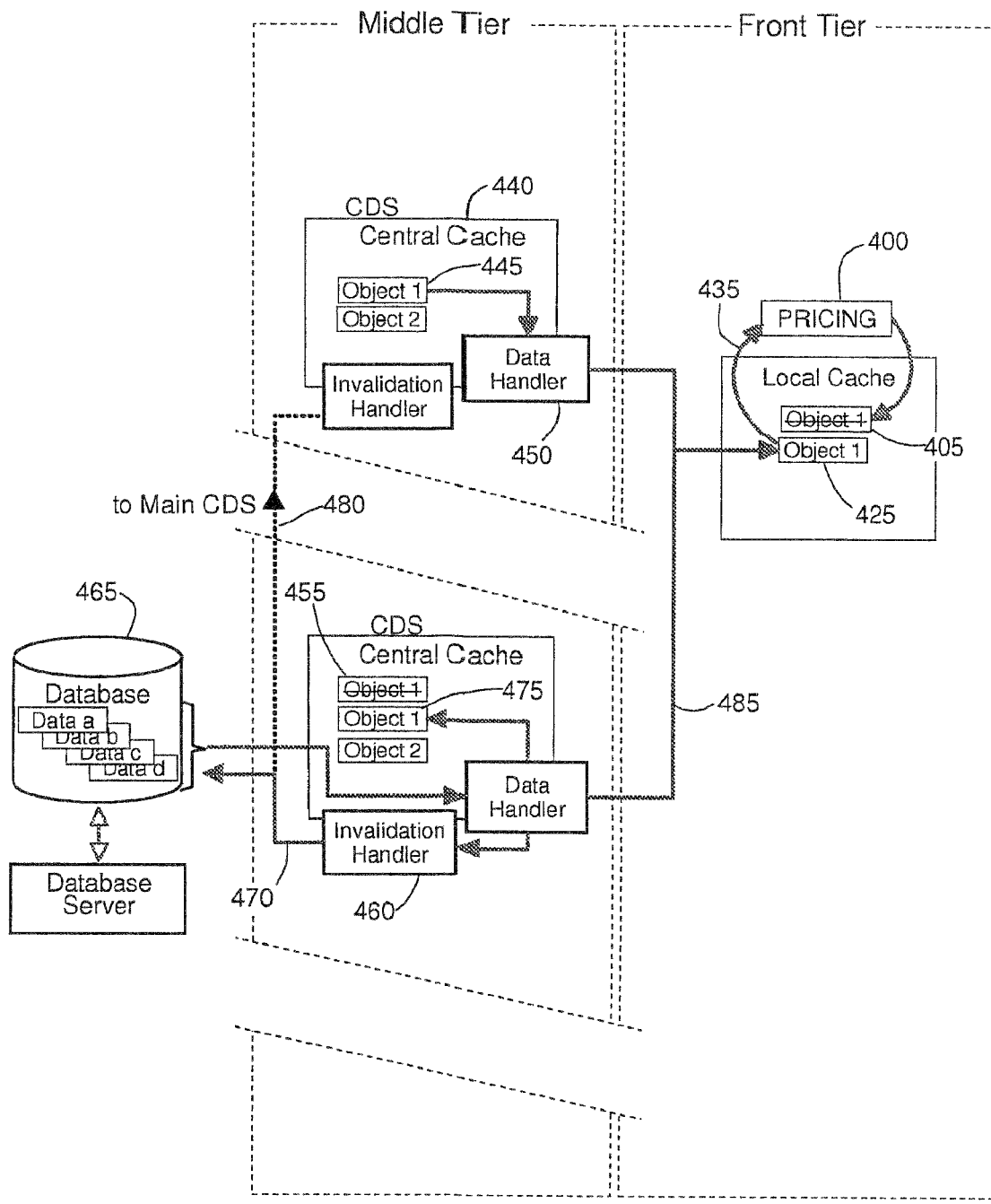
FIG. 4 discusses the aging of objects in local and central caches.

FIG. 4 discusses the aging of objects in caches. As already mentioned above, all constructed objects have a defined time-to-live (TTL) or an expiration date attached to them so that outdated elements can be removed from caches and do not stay for ever in memory.

When a software application (400) fetches an object which is outdated (405) in a local cache it is removed and thus, not returned to the requesting application. This triggers the interrogation of a middle tier CDS (the one selected by the load balancing function, not shown, as explained in FIG. 3). If object is present in central cache (445), and is not outdated, it is forwarded by the data handler (450) as previously explained, to local cache of calling application where it is stored (425) and from which it can be delivered (435) to the requesting application. This ends the process of replacing an outdated object in a local cache. If a fresh copy of the requested object is readily available in central cache it most likely results from the fact that another application, using another local cache, has already needed the same object which has thus been previously reconstructed in CDS.

However, if this is not the case i.e., if requested object is also outdated in central cache (455), it must be reconstructed. This is performed, as already explained in FIG. 3, from database (465) by the data handler which also requests invalidation (470) of the outdated object through an invalidation handler (460) function. Hence, outdated object is eventually replaced in central cache by a newly constructed one (475) and also replicated in all middle tier CDS's as explained in FIG. 3. It is important to note here that, if CDS from which an outdated object (455) has been requested is not the main CDS but a backup CDS, as a result of the choice performed by the load balancing function mentioned in FIG. 3, the reconstruction is not actually performed by the backup data handler. The object invalidation request is rather forwarded (480) to the main CDS invalidation handler so that it is main CDS which performs the reconstruction instead and replicates the reconstructed object in all backups in order that all middle tier CDS's are eventually updated including the one that has received the original request.

Because reconstruction can be a lengthy process the object originally requested (455) although outdated, is however delivered to the requesting local cache (485) so that requesting application (400) is not stuck. Prior to delivery, TTL of object is set to a very low value though. Hence, object is still useable for the current request(s), while reconstruction is in progress, as explained above. Further requests, received after the short TTL has expired, will thus use the new reconstructed object. This way of operating is compatible with the kind of application considered by the invention where air fares are updated regularly however, with flexible update times since it takes anyway a significant time to deploy a new set of air fares over a large network.

Figure 5:
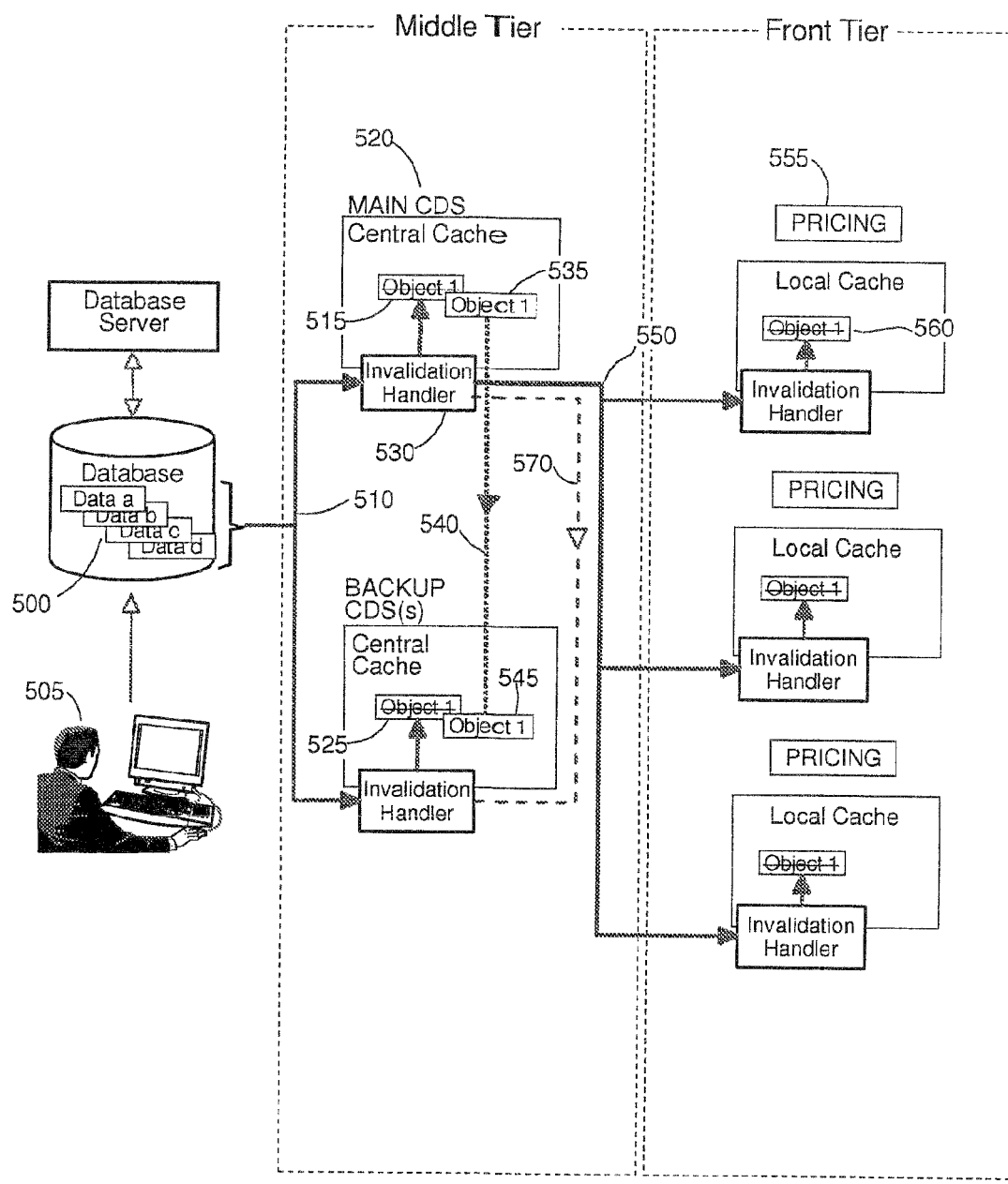
FIG. 5 describes the invalidation of objects in caches when data elements are modified in databases.

FIG. 5 describes the invalidation of objects in caches when data elements are modified in databases (500). This occurs whenever database are updated by their users (505) i.e., those in charge of updating and managing their contents. The database server is able to detect what data elements, which were used to build objects, have changed. The set of objects impacted are then determined in order to have them invalidated and possibly reconstructed in central caches. To this end the database broadcasts (510) object invalidation commands to all CDS's i.e. to main CDS and backup CDS(S) where all impacted objects are invalidated (515, 525).

On the main CDS (520), the invalidation handler (530) has first to decide whether an invalidated object has to be deleted or reconstructed. Indeed, an object still present in central cache may not deserve to be reconstructed. For example, if it has not been used for a long time or is seldom used or is frequently invalidated, invalidation handler may simply decide to delete it so as to not occupy cache memory uselessly and save the processing power and communication bandwidth necessary for the reconstruction. The decision is made according to predefined settings. Behavior of the invalidation handler is defined and set by CDS administrators.

Then, if decision is made to delete the object the corresponding cache memory space is freed. However, if invalidation handler decides that object must be reconstructed this is done from database in a similar way as already explained in FIG. 3. Once reconstructed (535), the object is replicated (540) in all CDS's so that they are synchronized and a fresh copy is available from all central caches (545).

Whichever deletion or reconstruction of object is performed, main CDS invalidation handler propagates object invalidations to all satellites (550) to prevent software applications (555) of the front-tier servers to use obsolete objects (560). When a software application will need again an invalidated object, which is therefore no longer available in local cache, fetching of object from CODS and, possibly, its reconstruction will occur as already explained in FIG. 3.

Also, upon completion of object deletion or reconstruction, the invalidations are notified (570) from the main CDS to the backup CDS(s). This is done to take care of the management of an in-progress table used by the invalidation handler as discussed in next figure.

Figure 6:
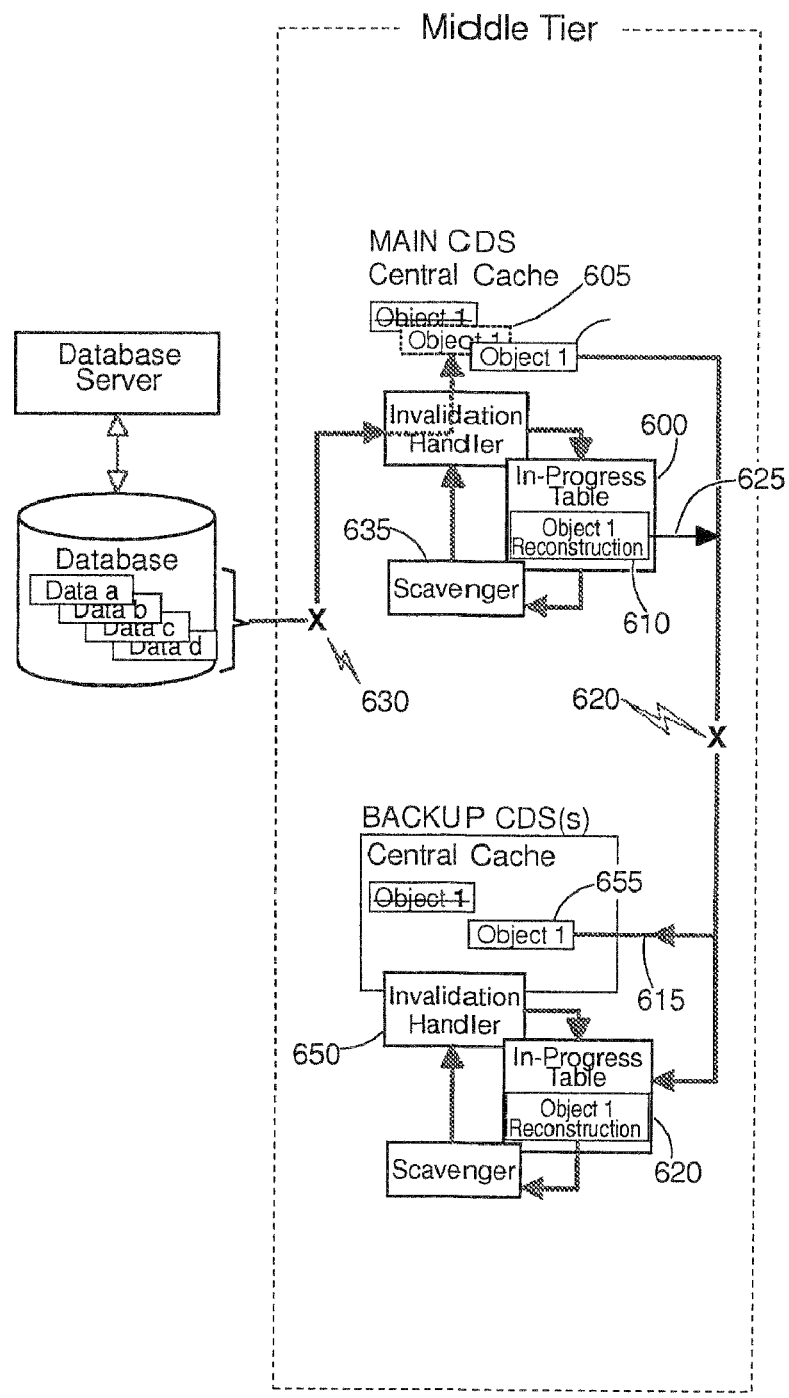
FIG. 6 discusses the reconstruction of invalidated objects.

FIG. 6 further discusses the reconstruction of an invalidated object.

When this must occur, as explained in FIG. 5, there is an in-progress table (600) in CDS's which is updated upon reception of an object invalidation request. The operation in progress i.e., the reconstruction (605) of an invalidated object is logged in table (610) of main CDS and forwarded to backup in-progress tables too (625). Also, the TTL or expiration date of the invalidated current object is changed to a low value so that it is still useable while new object is being reconstructed as previously discussed.

The normal completion of this operation is that object is normally reconstructed and passes all verifications and checking (640). In which case it is just forwarded (615) to backup CDS's as already discussed so that it becomes available in all central caches. At the same time the logging of the operation in progress is erased from the main in-progress table and also from the ones of the backup CDS's (620) which receive the reconstructed object (615).

These operations may possibly not end normally though without affecting the good operation of the CDS in the long term.

A first situation to consider is when object in main CDS cannot be reconstructed completely for example, because the necessary data elements were not all transferred properly from the database (630). Reconstruction operation must be reattempted, start of which has been logged in the in-progress table (500). The pending operation is thus detected by a scavenger process (635) that monitors and periodically inspects the in-progress table. There is obviously a limit to the number of retries attempted by the invalidation handler for the pending operation logged in the in-progress table. Under normal conditions, one of the retries is successful and operation resume normally as explained above.

A second situation to consider is when the object just reconstructed (610) is not transferred normally to any number of backup CDS's. This is detected in a similar way as in main CDS since backup CDS's all have an in-progress table too (620). Hence, the backup scavenger process detects the pending operation which was logged as a result of the object invalidation broadcast from the database. Backup CDS's, which expect main CODS to reconstruct the invalidated object, do not normally undertake any object reconstruction. However, this can be exceptionally triggered by the backup invalidation handier (650) when scavenger reports a problem. When this situation is encountered backup invalidation handier eventually reconstructs (655) the invalidated object for its own cache, behaving temporarily as a main CDS. This requires the retransfer (to the backup CDS) of the necessary data elements from the database. After which pending item of in-progress table can be erased and operation can resume normally for affected backup CDS.

Figure 7:
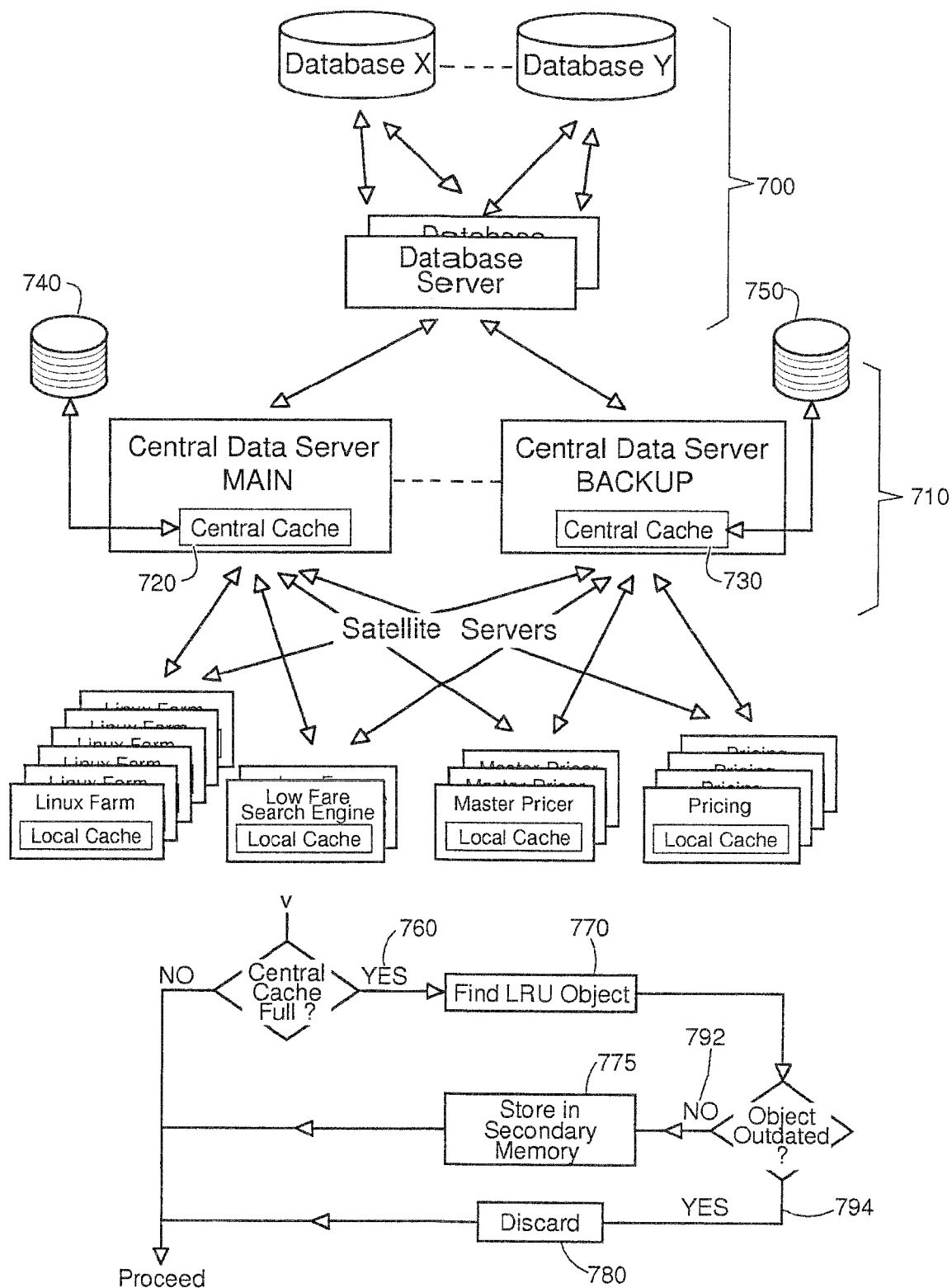
FIG. 7 describes the storing, in a secondary memory, of non-outdated objects that must be removed from central caches.

FIG. 7 briefly describes an optional feature of the invention.

A cache has necessarily a finite size since it is built out of the available active memory of the central server in which it resides. It may thus happen that cache becomes full: not enough memory is left to construct a new requested object. A standard practice with caches is then to remove the least recently used (LRU) object to make room for the new object.

Other replacement algorithms may apply as well. Whichever algorithm is used, selected object to remove, which has not been used recently, may still be a valid object i.e., it is not outdated. As already pointed out, objects according to the invention are complex objects which require significant processing power from the server central processing unit (CPU) to be constructed and also require multiple accesses to the background databases (700). Hence, reconstruction of an object is costly and discarding should be avoided if object is not outdated when removed from cache.

When a central cache is full (760) either in main CDS (720) or in any of the backup CDS's (730), and e.g., the LRU object has been selected (770) to be removed, this latter can be stored (775) into a secondary memory (740, 750), easily accessible from the server, if it is not outdated (792), instead of being discarded (780). If object is outdated (794) it must be discarded though. The secondary memory is generally a dedicated memory space from a hard disk attached to the server. Hence, reconstruction of non outdated objects can be avoided. To do so, CDS's keep track of objects stored in secondary memories. When an application needs one of them again, it is retrieved from the corresponding secondary memory instead of being reconstructed. The same mechanism applies i.e., LRU object is removed from cache to make room for the requested object which is first searched in secondary memory before being reconstructed if search is not successful or if object has become outdated since it was stored in secondary memory.

What is claimed is:

1. A method of maintaining coherence of cache contents comprising:

using a multi-tier software architecture including a front tier comprising at least one satellite server, each said at least one satellite server operating a local cache, said architecture including a middle tier comprising a plurality of central servers wherein one central server is designated as a main central server and all other central servers are backup central servers, each central server operating a central cache, the main central server interfacing with at least one database through at least one database server, said at least one database containing data elements;

receiving, at one of the backup central servers, a request for an object from the at least one satellite server;

detecting that the object is outdated in said one of the backup central servers;

sending an object invalidation request from an invalidation handler of said one of the backup central servers to the main central server;

triggering a constructing step in said main central server;

constructing said object in said main central server, comprising:

checking whether said central cache of the main central server is full or not; upon said central cache not being full, proceeding immediately to said constructing step; upon said central cache being full, selecting a least recently used object in said central cache;

checking whether said least recently used object is outdated or not; upon said least recently used object not being outdated, storing said least recently used object in a secondary memory and deleting the least recently used object from the central cache; upon said least recently used object being outdated, discarding said least recently used object; and, in both cases, proceeding to said constructing;

retrieving data elements from said at least one database by means of at least one query issued from the main central server;

building said object from plural of said data elements;

validating said object;

attributing a time to live (TTL) to said objects; and storing said objects in the central cache of the main central server;

replicating said object in all of the backup central servers;

forwarding said object to the at least one satellite server requesting said object, said forwarding step including a further step of:

storing said object in the local cache of at least one satellite server requesting said objects;

delivering said object from the local cache of the at least one satellite server requesting said object to at least one of a software application running on the at least one satellite server and requesting said object.

2. The method according to claim 1, comprising receiving at the middle tier a plurality of requests for objects from a plurality of satellite servers, and wherein requests from said satellite servers are load balanced over all available said central servers and wherein one of said central servers is selected per request.

3. The method according to claim 1, wherein the step of attributing a TTL and the step of storing said object is replaced by the step of: rejecting said object upon said validating step failing to validate said objects.

4. The method according to claim 1, wherein before sending an object invalidation request, TTL of said outdated object is set to a value before being forwarded to the requesting satellite server.

5. The method according to claim 1, wherein the central servers each include an invalidation handler, and objects stored in said central caches and in said local caches are invalidated as soon as at least one said data element used to construct said objects has been modified in said database, comprising the steps of: determining which objects are impacted;

broadcasting invalidation commands to all invalidation handlers of said central servers; invalidating corresponding objects in said central caches; propagating said invalidation commands to all said local caches; invalidating corresponding objects in said local caches, said invalidating step including the further step of deleting said objects.

6. The method according to claim 5, wherein the step of invalidating objects in said central caches includes the further step of deleting said objects.

7. The method according to claim 6, wherein the step of invalidating objects in said central caches includes the step of reconstructing said objects in said main central server, comprising the further step of replicating said reconstructed objects into all said backup central servers.

8. The method according to claim 7, wherein each said central server includes an object reconstruction in-progress table and a scavenger process to monitor said object reconstruction from said in- progress-table, comprising the steps of:

logging beginning and ending of object reconstructions in said in-progress table;

inspecting said in-progress tables to detect completion of said object reconstructions, comprising the further step of:

erasing table entries of object reconstructions that have successfully completed;

detecting failing in-progress object reconstructions; re-attempting failing object reconstructions.

9. The method according to claim 8, wherein said object reconstructions are performed in said main central server and wherein said logging step includes the further step of: forwarding object reconstruction beginnings to all said in-progress tables of backup central servers.

10. The method according to claim 9, wherein object reconstruction endings are logged in said in-progress tables of backup central servers on reception of objects forwarded from main central server.

11. The method according to claim 8, wherein said detecting step and said re- attempting step are performed in one of said backup central servers.

12. The method according to claim 1, wherein said secondary memory is further searched for a requested object before proceeding to said reconstructing step.

13. The method of claim 1, wherein:
the constructing step comprises constructing a plurality of objects;
at least one data element is used for building several objects.

14. The method of claim 1, wherein the middle tier comprises at least two backup servers.

15. The method of claim 1 wherein the step of forwarding said object to the at least one satellite server requesting said object is performed from the main central server.

16. The method of claim 1, further comprising:
receiving at one of the central servers a request for an object from the at least one satellite server;
detecting that the object is missing in said one the central servers;
triggering a constructing step in said one of the central servers comprising:
retrieving data elements from said at least one database by means of at least one query issued from said one of the central servers;
building said missing object;
attributing a time to live (TTL) said missing object;
storing said missing object in the central cache of said one of the central servers.

17. The method of claim 16, further comprising:
replicating the missing object in the central cache of all other central servers.

18. A system for maintaining coherence of cache contents in a multi-tiered architecture of servers, comprising:
a multi-tier software architecture including a front tier comprising at least one satellite server, each said at least one satellite server operating a local cache, said architecture including a middle tier comprising a plurality of central servers wherein one central server is a main central server and all other central servers are backup central servers, each central server operating a central cache, the main central server interfacing with at least one database through at least one database server, said at least one database containing data, said at least one satellite server, said main central server, said backup central servers and said at least one database server programmed to perform:
receiving, at one of the backup central server, a request for an object from the at least one satellite server;
detecting that the object is outdated or missing in said one of the backup central servers;
sending an object invalidation request from an invalidation handler of said one of the backup central servers to the main central server;
triggering a constructing step in said main central server;
constructing said object in said main central server, comprising:
checking whether said central cache of the main central server is full or not; upon said central cache not being full, proceeding immediately to said constructing step; upon said central cache being full, selecting a least recently used object in said central cache;
checking whether said least recently used object is outdated or not; upon said least recently used object not being outdated, storing said least recently used object in a secondary memory and deleting the least recently used object from the central cache; upon said least recently used object being outdated, discarding said least recently used object; and, in both cases, proceeding to said constructing;
retrieving data element from said at least one database by means of at least one query issued by the main central server;
building said object from plural of said data elements;
validating said object; attributing a time to live (TTL) to said object; and storing said object in the central cache of the main central server;
replicating said object in all of the central backup servers;
forwarding said object to the at least one satellite server requesting said object, said forwarding step including a further step of:
storing said object in the local cache of at least one satellite server requesting said object;
delivering said object from the local cache of the at least one satellite server requesting said object to at least one of a software application running on the at least one satellite server and requesting said objects.

19. The system of claim 18, including a means for constructing objects with data elements from at least one database, a means for invalidating said data objects upon being outdated, and means for managing reconstruction of said outdated objects.

20. A non-transitory computer readable storage medium with a computer program stored thereon, comprising computer readable code means for causing at least one computer to operate the method of maintaining coherence of cache contents in a multi-tier software system comprising:
using the multi-tier software architecture including a front tier comprising at least one satellite server, each said at least one satellite server operating a local cache, said architecture including a middle tier comprising a plurality of central servers wherein one central server is a main central server and all other central servers are backup central servers, each central server operating a central cache, the main central server interfacing with at least one database through at least one database server, said at least one satellite server, said main central server, said backup central servers and said at least one database server programmed to perform:
receiving, at one of the backup central servers, a request for an object from the at least one satellite server;
detecting that the object is outdated in said one of the backup central servers;
sending an object invalidation request from an invalidation handler of said one of the backup central servers to the main central server;
triggering a constructing step in said main central server;
constructing said object in said main central server, comprising:
checking whether said central cache of the main central server is full or not; upon said central cache not being full, proceeding immediately to said constructing step;

upon said central cache being full, selecting a least recently used object in said central cache;

checking whether said least recently used object is outdated or not; upon said least recently used object not being outdated, storing said least recently used object in a secondary memory and deleting the least recently used object from the central cache; upon said least recently used object being outdated, discarding said least recently used object; and, in both cases, proceeding to said constructing;

retrieving data element from said at least one database by means of at least one query issued from the main central server;

building said object from plural of said data elements;

validating said object;

attributing a time to live (TTL) to said objects; and storing said objects in the central cache of the main central server;

replicating said object in all of the backup central servers;

forwarding said object to the at least one satellite server requesting said object, said forwarding step including a further step of:

storing said object in the local cache of at least one satellite server requesting said object;

delivering said object from the local cache of the at least one satellite server requesting said object to at least one of a software application running on the at least one said satellite server and requesting said object.

21. A method of maintaining coherence of cache contents, comprising:

using a multi-tier software architecture including a front tier comprising at least one satellite server, each said at least one satellite server operating a local cache, said architecture including a middle tier comprising at least three central servers wherein one central server is designated as a main central server and all other central servers are backup central servers, each central server operating a central cache, only the main central server interfacing with at least one database through at least one database server, said at least one database containing data elements;

receiving, at one of the backup central servers, a request for an object from the at least one satellite server;

detecting that the object is outdated in said one of the backup central servers;

sending an object invalidation request from an invalidation handler of said one of the backup central servers to the main central server;

triggering a constructing step in said main central server;

constructing said object in said main central server, comprising:

checking whether said central cache of the main central server is full or not; upon said central cache not being full, proceeding immediately to said constructing step; upon said central cache being full, selecting a least recently used object in said central cache;

checking whether said least recently used object is outdated or not; upon said least recently used object not being outdated, storing said least recently used object in a secondary memory and deleting the least recently used object from the central cache; upon said least recently used object being outdated, discarding said least recently used object; and, in both cases, proceeding to said constructing;

retrieving data elements from said at least one database by means of at least one query issued from the main central server;

building said object from plural of said data elements;

validating said object;

attributing a time to live (TTL) to said object; and storing said object in the central cache of the main central server;

in each central cache of the backup central servers, determining a free memory space;

for each central cache with a free memory space insufficient to accommodate the object, removing a least recently used object from said central cache;

replicating said object in the central caches of all of the backup central servers;

forwarding said object to the at least one satellite server requesting said object from the main central server, said forwarding step including a further step of:

storing said object in the local cache of the at least one satellite server requesting said object;

delivering said object from the local cache of the at least one satellite server requesting said object to at least one of a software application running on the at least one satellite server and requesting said object.

* * * * *

UNITED STATES PATENT AND TRADEMARK OFFICE
CERTIFICATE OF CORRECTION

Page 1 of 1

PATENT NO. : 8,364,650 B2
APPLICATION NO. : 12/088860
DATED : January 29, 2013
INVENTOR(S) : Janin Benoit It is certified that error appears in the above-identified patent and that said Letters Patent is hereby corrected as shown below:

On the cover sheet, in the Abstract section, in the ninth line, after "then" delete ","

In the Specification:

At column 2, line number 49, after "services" insert --,--

At column 3, line number 44, change "then, broadcast" to --then broadcast,-- and at line 46, change "caches then, propagate" to --caches, then propagate--

At column 6, line number 59, change "handier" to --handler--

At column 7, line number 4, change "handier" to --handler-- and at line 6 change "handier" to --handler-- and at line 35 change "database" to --databases-- and at line 44 change "handier" to --handler-- and at line 63 change "handier" to --handler--

At column 8, line number 6, change "handier" to --handler-- and at line 40 change "operation" to --operations-- and at line 52 change "handier" to --handler-- and at line 54 change "handier" to --handler--

At column 9, line number 20, change "non outdated" to --non-outdated--

In the Claims:

At column 10, claim number 3, line number 27, change "is" to --are--

At column 11, claim number 16, line number 31, after "one" insert --of-- and at line number 39, before "said" insert --to-- and at line number 60, change "server" to --servers--

Signed and Sealed this
Twenty-sixth Day of March, 2013

Teresa Stanek Rea
*Acting Director of the United States Patent and Trademark Office*